United States Patent [19]

Kakimoto et al.

[11] Patent Number: 4,491,304
[45] Date of Patent: Jan. 1, 1985

[54] FLUID-FILLED ENGINE MOUNT DEVICE

[75] Inventors: Toshihiko Kakimoto, Tokyo; Keizo Konishi, Inuyama; Teruo Yonehama, Konan; Takao Yamamoto, Iwakura, all of Japan

[73] Assignee: Nissan Motor Company, Limited, Yokohama, Japan

[21] Appl. No.: 366,938

[22] Filed: Apr. 9, 1982

[30] Foreign Application Priority Data

Apr. 15, 1981 [JP] Japan ................... 56-56755

[51] Int. Cl.³ .................. F16M 5/00; F16F 15/04; B60G 11/62
[52] U.S. Cl. .................. 267/140.1; 248/562; 248/636; 248/659; 267/35; 267/141.2
[58] Field of Search ........... 267/35, 63 R, 136, 140.1, 267/141, 141.1, 141.2, 141.4, 153; 248/562, 634, 636, 638, 659

[56] References Cited

FOREIGN PATENT DOCUMENTS

| 233809 | 11/1959 | Australia | 267/63 R |
| 6819 | 1/1980 | European Pat. Off. | |
| 39823 | 11/1981 | European Pat. Off. | |
| 2727244 | 1/1978 | Fed. Rep. of Germany | 267/35 |
| 3040396 | 5/1981 | Fed. Rep. of Germany | |
| 2435632 | 4/1980 | France | |
| 139536 | 10/1980 | Japan | 267/140.1 |

Primary Examiner—Duane A. Reger
Assistant Examiner—Robert J. Oberleitner
Attorney, Agent, or Firm—Thompson, Birch, Gauthier & Samuels

[57] ABSTRACT

An engine mount device comprises first and second base plate members; an elastic block securely interposed between the first and second base plate members and formed with a cavity; a partition plate member connected to one of the first and second base plate members and formed with an orifice; a diaphragm member connected to the one of the first and second base plate members and defining an auxiliary chamber between it and the partition plate member, the auxiliary chamber being in communication with the fluid chamber through the partition plate member orifice, at least a part of the fluid and auxiliary chambers being filled with a fluid; and a rigid ring disposed around the intermediate section of the elastic block thereby restricting the expansion of the elastic block; the elastic block and the rigid ring serving as a dynamic damper for damping vibration having predetermined frequencies, thereby rendering unnecessary installing the dynamic damper independent from the engine mount device.

4 Claims, 3 Drawing Figures

FLUID-FILLED ENGINE MOUNT DEVICE

BACKGROUND OF THE INVENTION

1. Field of the Invention

This invention relates to a fluid-filled engine mount device through which a power unit is mounted on a support body, and more particularly to the fluid-filled engine mount device having the function of a dynamic damper.

2. Description of the Prior Art

It is well known in the art that a fluid-filled engine mount device is used between an automotive engine side and a vehicle body frame side to damp the vibration caused by the bound and rebound of the vehicle body. The fluid-filled engine mount device is in general so configured that a hollow rubber block is securely interposed between upper and lower base plate members which are connected to the engine side and the body frame side, respectively. The hollow of the rubber block serves as a fluid chamber filled with a fluid, and the fluid chamber is in communication through an orifice of a partition plate member with an auxiliary chamber. Fluid flow takes place between the fluid and auxiliary chambers in response to the vibration applied to the engine mount device, thereby absorbing input vibration by virtue of the restricted fluid flow through the partition plate member orifice.

In addition to the engine mount device, a dyanmic damper is installed between the engine side and the vehicle body side in order to damp high frequency fine vibration transmitted from the engine to the vehicle body which vibration causes a booming noise within the passenger compartment. The dynamic damper is so arranged as to produce a resonant vibration in response to the above-mentioned high frequency fine vibration.

However, since the dynamic damper is installed separately and independently from the engine mount device, a relatively large space is required for both of them within a relatively narrow engine compartment. Besides, using two implements for the purpose of vibration damping is disadvantageous from the standpoints of weight-lightening and production cost.

SUMMARY OF THE INVENTION

According to the present invention, an engine mount device comprises first and second base plate members which are spaced from each other and connected to a power unit side and a vehicle body side, respectively. An elastic block is interposed between the first and second base plate members and is formed with a cavity. A partition plate member is connected to one of the first and second base plate members and is formed with an orifice. A fluid chamber is defined between the partition plate member and the wall surface of the elastic block cavity. A diaphragm member is connected to the one of the first and second base plate members and defines an auxiliary chamber between it and the partition plate member. The auxiliary chamber is in communication with the fluid chamber through the partition plate member orifice. At least a part of the fluid and auxiliary chambers is filled with a fluid. Additionally, a rigid ring is disposed at the intermediate section of the elastic block in the direction in which the elastic block expands and contracts. The elastic block and the rigid ring serve as a dynamic damper for damping vibrations having predetermined frequencies by producing resonant vibration itself.

The thus arranged engine mount device is provided with the function of a dynamic damper, and therefore it becomes unnecessary to install the dynamic damper separately and independently from the engine mount device, thereby providing advantages from the standpoints of the required space within the engine compartment, weight-lightening and production cost.

BRIEF DESCRIPTION OF THE DRAWINGS

The features and advantages of the engine mount device according to the present invention will be more clearly appreciated from the following description taken in conjunction with the accompanying drawings in which.

DETAILED DESCRIPTION OF THE INVENTION

Figure 1A:
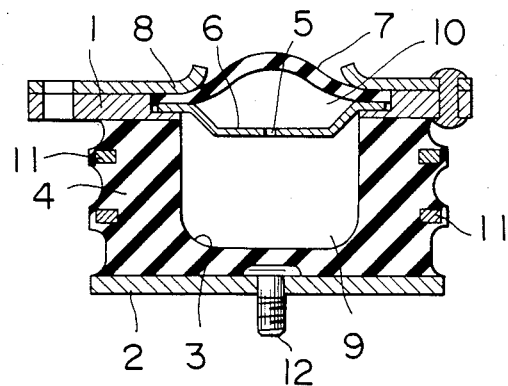
FIG. 1A is a vertical sectional view of a conventional engine mount device.

To facilitate understanding the present invention, a brief reference will be made to a conventional fluid-filled engine mount device, depicted in FIG. 1A. The conventional engine mount device includes upper and lower base plate members 1, 2 which are connected to a power unit side and a vehicle frame side, respectively. A rubber block 4 is securely disposed between the upper and lower base plate members 1, 2 and has formed therein a cavity 3. A partition plate member 6 having an orifice 5 is securely connected at its peripheral section to the upper base plate member 1. Additionally, a diaphragm member 7 is disposed over the partition plate member 6 and is securely connected at its peripheral section to the peripheral section of the partition plate member 6 under the action of a pressure plate 8. Accordingly, a fluid chamber 9 is defined below the partition plate member 6, and an auxiliary chamber 10 is defined between the partition plate member 6 and the diaphragm member 7. The fluid chamber 9 and the auxiliary chamber 10 are in communication with each other through the orifice 5 and filled with a fluid. The reference numeral 11 denotes a restriction ring for preventing the rubber block 4 from inflating outwardly so as to attain the volume change in the fluid chamber 9 during the expansion and contraction of the rubber block 4. Additionally, a bolt 12 secured to the lower base plate member 2 is for fixing the lower base plate member 2 onto a vehicle frame or the like.

With this arrangement, when the rubber block 4 expands and contracts due to input vibration, the volume change in the fluid chamber 9 is made to cause fluid movement between the fluid chamber 9 and the auxiliary chamber 10 through the orifice 5, thereby generating flow resistance during the fluid passage through the orifice 5. This flow resistance damps the input vibration, thereby suppressing vibration of the vehicle.

Figure 1B:
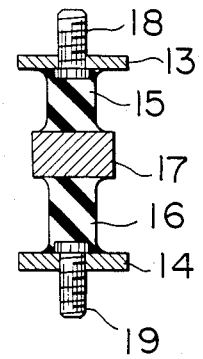
FIG. 1B is a vertical sectional view of a conventional dynamic damper used separately from but in combination with the engine mount device of FIG. 1A.

FIG. 1B shows a so-called dynamic damper which is disposed separately and independently from the above-discussed engine mount device. The dynamic damper includes upper and lower base plates 13, 14 which are connected to the power unit side and the vehicle frame side, respectively. Upper and lower resilient rubbers 15, 16 are secured to the upper and lower base plates 13, 14, respectively. Additionally, a metal mass or weight member 17 is securely supported to be interposed between the opposite ends of the upper and lower rubbers 15, 16. The reference numeral 18 designates a bolt for connecting the upper base plate 13 onto the power unit side, and the reference numeral 19 a bolt for connecting the lower base plate 14 onto the vehicle body side.

Besides, in the thus arranged dynamic damper, the nautral frequency (f') of a system constituted by the resilient rubbers 15, 16 and the metal mass member 17 is set at a valve expressed by the following equation:

$$f' = \frac{1}{2\pi} \sqrt{\frac{W'}{k'}}$$

where "k'" is the spring constant of the resilient rubbers 15, 16; and "W'" is the weight of the metal mass member 17. With the thus set natural frequency of the system constituted by the resilient rubbers 15, 16 and the metal mass member 17, the resonance vibration of the metal mass member 17 takes place at a high frequency fine vibration range where the so-called booming noise is generated, in which the phase difference between the vibrations of the metal mass member 17 and the power unit upper base plate member 13 becomes 180 degrees. By virtue of this phase difference, the vehicle body side is supplied with the vibration whose phase is inverse relative to that of the vibration of the above-discussed engine mount device shown in FIG. 1A. Accordingly, the vibration applied through the engine mount device to the vehicle body side can be offset by the vibration applied through the dynamic damper, thereby damping the high frequency fine vibration of the power unit side, transmitted to the vehicle body side.

However, the dynamic damper is disposed separately and independently from the engine mount device, and therefore the required space for them unavoidably becomes larger in an engine compartment of a vehicle. This creates problems in selecting a suitable location for them, since it is necessary to prevent their interference with other parts in the engine compartment. Furthermore, the weight of the dynamic damper itself and the weight of the installation brackets are added to the vehicle, in addition to the weight of the engine mount device. This is disadvantageous from the standpoints of weight-lightening and production cost. Moreover, due to the fact that the engine mount device rubber block 4 and the dynamic damper resilient rubbers 15, 16 separate units makes it difficult for them to have uniform characteristics. As a result, it is difficult to match their characteristics with each other to attain a desired vibration damping effect.

Figure 2:
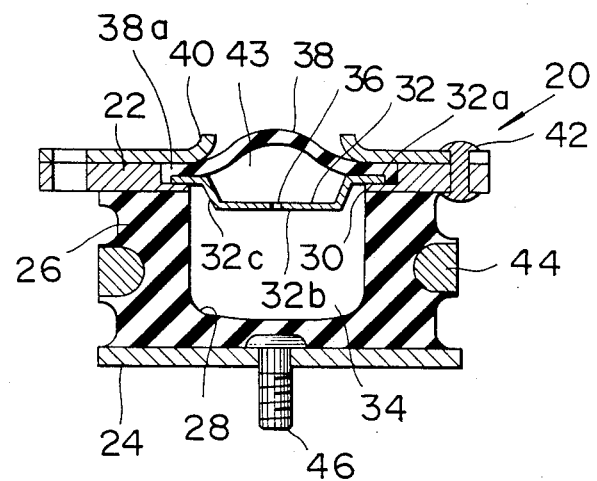
FIG. 2 is a vertical sectional view of a preferred embodiment of a fluid-filled engine mount device in accordance with the present invention.

In view of the above description of the combination of the conventional fluid-filled engine mount device and dynamic damper, reference is now made to FIG. 2, wherein a preferred embodiment of a fluid-filled engine mount device of the present invention is illustrated by the reference numeral 20. The engine mount device 20 comprises an upper or first base plate member 22 and a lower or second base plate member 24, both plate members 22, 24 being spaced from each other. The upper base plate member 22 is connected to a power unit (not shown) side or automotive internal combustion engine side, whereas the lower base plate member 24 is connected to a vehicle body (not shown) side such as an automotive vehicle body frame.

A block 26, made of elastic or elastomeric material such as rubber, is interposed between the upper and lower base plate members 22, 24 so as to be securely connected to the base plate members while maintaining a fluid-tight seal thereamong. The elastic block 26 is generally cup-shaped and is formed with a central cavity 28. The cavity 28 is formed coaxially with the elastic block 26. The upper base plate member 22 is also formed with an opening 30 having a shape identical with the cross-section of the elastic block cavity 28.

A partition plate member 32 is securely attached at its flat peripheral section 32a to the upper base plate member 22. The partition plate member 32 further has a flat central section 32b which is integrally connected to the peripheral section 32a through a generally vertically elongated mid-section 32c. As shown, the partition plate member mid-section 32c projects through the opening 30 of the upper base plate member 22 into the cavity 28 of the elastic block 26. The thus disposed partition plate member 32 defines therebelow or within the elastic block cavity 28 a fluid chamber 34 which is supplied or filled with a fluid which is usually liquid. The partition plate member 32 is formed at its central section 32b with an orifice 36.

A diaphragm member 38 is securely attached at its peripheral section 38a to the partition plate member peripheral section 32a by means of a pressure plate 40. The pressure plate 40 is fixed on the upper base plate member 22 by means of rivets 42 so as to press the diaphragm member 38 and the partition plate member 32 onto the upper base plate member 22 while maintaining a fluid-tight seal thereamong. An auxiliary chamber 43 is defined between the diaphragm member 38 and the partition plate member 32. The auxiliary chamber 43 is in communication with the fluid chamber 34 through the partition plate member orifice 36 and is thereby supplied or filled with the fluid.

A restriction ring 44 for preventing the outward inflation of the elastic block 26 is made of a rigid material and is so disposed as to be embedded in the elastic block 26 while its outer peripheral surface is exposed to ambient air. The restriction ring 44 is located around the intermediate section of the elastic block 26 and restricts the outward expansion of the elastic block. The restriction ring 44 is affixed to the elastic block 26 by means of adhesion due to vulcanization.

It is to be noted, in this instance, that the elastic block 26 and the restriction ring 44 comprise a system whose natural frequency is set at a value expressed by the following equations:

$$f = \frac{1}{2\pi} \sqrt{\frac{kg}{W}}$$

and,

50 Hz ≦ f ≦ 400 Hz where "W" is the weight of the restriction ring 44; "k" is the spring constant of the elastic block 26 in the axial direction of the elastic block; and "g" is gravitational acceleration.

The reference numeral 46 designates a bolt for fixing the lower base plate member 24 onto the vehicle body frame or the like.

The manner of operation of the thus arranged engine mount device will now be discussed.

When a low frequency vibration is applied to the engine mount device 20 during bound or rebound of the vehicle body, the rubber block 26 contracts and expands, but the elastic block 26 is prevented from its outward inflation and accordingly a large amount of volume change must take place in the fluid chamber 34. The rate of this low frequency volume change is relatively low, the movement of the fluid being carried out between the fluid chamber 34 and the auxiliary chamber 43 through the partition plate member orifice 36, thus creating flow resistance due to the fluid passage through the orifice 36. This effectively damps the input vibration, thereby suppressing the vibration of the vehicle.

When high frequency fine vibration is applied to the engine mount device from the engine side, the volume change in the fluid chamber 34 is smaller and the volume change rate of the fluid chamber is very high, so the fluid does not pass through the orifice 36. At this time, the elastic block 26 expands and contracts, and the system comprised by the elastic block 26 and the restriction ring 44 initiates its resonance vibration immediately before the vibration frequency rises to a frequency range where a booming noise is generated within a passenger compartment, by virtue of the fact that the natural frequency of the system is set at the above-mentioned value by selecting the characteristics of the elastic block 26 and the weight of the restriction ring 44. With respect to this resonance vibration, the phase of vibration of the restriction ring 44 becomes inverse relative to that of the vibration transmitted from the engine side to the upper base plate member 22 of the engine mount device 20 within the high frequency range where the booming noise is generated. As a result, the vibration applied from the engine side to the engine mount device upper base plate member 22 is offset by the restriction ring vibration whose phase is inverse to the input vibration from the engine side, thereby greatly damping the vibration transmitted to the lower base plate member 24 of the engine mount device 20.

Within a range where the frequency of the input vibration is sufficiently high relative to the resonance point of the system constituted by the elastic block 26 and the restriction ring 44, the amplitude of vibration of the restriction ring 44 decreases but the phase of the restriction ring 44 remains shifted from that of the input vibration, so that the transmitted vibration to the lower base plate member 24 is continuously damped. Even when the frequency of the input vibration becomes extremely high so that the restriction ring 44 becomes stationary, the vibration transmission to the lower base plate member 24 of the engine mount 20 can be suppressed because the vibration of the elastic block 26 in the vicinity of the restriction ring 44 is suppressed.

It is necessary to set the natural frequency of the system constituted by the elastic block 26 and the restriction ring 44 after taking the characteristics of the vehicle body, the power unit, chassis parts etc. into consideration. It is, in general, sufficient that the above-mentioned natural frequency is within a range of from 100–200 Hz. However, in this instance, the natural frequency of the above-mentioned system is set at the value ranging from 50–400 Hz upon taking account of damping booming noise at relatively low engine speeds and combustion noise at relatively high engine speeds.

While the restriction ring 44 is located at the intermediate positions between the upper and lower base plate members 22, 24 and the spring constant of the upper (base plate member 22 side) and lower (base plate member 24 side) half-sections of the elastic block relative to the restriction ring 44 are the same or approximately same in the above-discussed embodiment, it will be understood that the restriction ring 44 may be one-sided toward the partition plate member 22 or toward the partition plate member 24, and/or either one of the upper and lower half-sections of the elastic block 26 may be higher in rigidity than the other, in order to differentiate in spring constant the upper and lower half-sections of the elastic block 26, thereby attaining vibration damping effect over a wide range of vibration frequencies.

As will be appreciated from the above-discussion, according to the present invention, the restriction ring is disposed at the intermediate section of the elastic block of the engine mount device to prevent the outward inflation of the elastic block. The restriction ring serves, in combination with the elastic block, as a dynamic damper. Accordingly, an independent and separate damper is unnecessary and therefore the required space for implements for the same purpose becomes smaller within the engine compartment, thereby decreasing the interference with parts in the engine compartment. This increases the freedom in selecting the location of the engine mount device. Besides, merely by slightly increasing the weight of the restriction ring, the dynamic damper and the attachment brackets therefor become completely unnecessary, thereby attaining the weight-lightening of the vehicle body and lowering in production cost. Additionally, since only the elastic block expands and contracts, it becomes unnecessary to match the characteristics of the elastic block with other members which expand and contract.

What is claimed is:
1. An engine mount device comprising:
first and second base plate members which are spaced from each other and connected to a power unit side and a vehicle body side, respectively;
a block made of elastic material and having a cavity, said block being interposed between and secured to said first and second base plate members;
a partition plate member having an orifice, said partition plate member defining a fluid chamber between it and the wall surface of said elastic block cavity;
a diaphragm member affixed to said one of said first and second base plate members and defining an auxiliary chamber between it and said partition plate member, said auxiliary chamber being in communication with said fluid chamber though said partition plate member orifice, at least a part of said fluid and auxiliary chambers being filled with a fluid;
a rigid ring disposed around the intermediate section of said elastic block restricting the radial expansion of said elastic block; and
dynamic damper means including a vibration system constituted by said elastic block and said rigid ring, the natural frequency of said vibration system being so set as to make the resonance vibration of said vibration system have a predetermined frequency, the natural frequency of said vibration system being set at a value expressed by the following equations:

$$f = \frac{1}{2\pi} \sqrt{\frac{kg}{W}}$$

and additionally,

50 Hz $\leq f \leq$ 400 Hz where "W" is the weight of said rigid ring; "k" is the spring constant of said elastic block in the axial direction in which said elastic block expands and contracts in response to an input vibration; and "g" is gravitational acceleration.

2. An engine mount device as claimed in claim 1, wherein said predetermined frequency is slightly lower than that of a vibration which causes booming noise.

3. An engine mount device as claimed in claim 1, wherein said cavity is coaxial with said elastic block.

4. An engine mount device as claimed in claim 1, wherein said rigid ring is located coaxially with said elastic block cavity and embedded in said elastic block while exposing a part of said rigid ring to ambient air.

* * * * *

UNITED STATES PATENT AND TRADEMARK OFFICE
CERTIFICATE OF CORRECTION

PATENT NO. : 4,491,304
DATED : January 1, 1985
INVENTOR(S) : Toshihiko Kakimoto et al It is certified that error appears in the above-identified patent and that said Letters Patent are hereby corrected as shown below:

On the title page;

After "[73] Assignee: Nissan Motor Company, Limited, Yokohama, Japan", insert -- and Tokai Rubber Industries, Ltd., Komaki City, Japan --

Signed and Sealed this

Fifteenth Day of October 1985

[SEAL]

Attest:

Attesting Officer

DONALD J. QUIGG

Commissioner of Patents and Trademarks—Designate